Dec. 26, 1922.

V. O. GREENE.
REGISTERING DEVICE.
FILED JAN. 12, 1922.

Inventor
Vergil O. Greene,
Attorney

Dec. 26, 1922.

V. O. GREENE.
REGISTERING DEVICE.
FILED JAN. 12, 1922.

Inventor
Vergil O. Greene,
By
Attorney

Inventor
Vergil O. Greene,
By
Attorney

Dec. 26, 1922.
V. O. GREENE.
REGISTERING DEVICE.
FILED JAN. 12, 1922.

Inventor
Vergil O. Greene,
By
Attorney

Patented Dec. 26, 1922.

1,440,353

UNITED STATES PATENT OFFICE.

VERGIL O. GREENE, OF CHILLICOTHE, MISSOURI.

REGISTERING DEVICE.

Application filed January 12, 1922. Serial No. 528,827.

*To all whom it may concern:*

Be it known that I, VERGIL O. GREENE, a citizen of the United States, residing at Chillicothe, in the county of Livingston and State of Missouri, have invented certain new and useful Improvements in Registering Devices, of which the following is a specification.

This invention relates to registering devices, and more particularly to a device of this character adapted for connection to various operating elements of an automobile to register the consumption of the liquid fuel.

An important object of the invention is to provide a registering device which will accurately and efficiently register the consumption of fuel without interfering with the usual fuel pipes and connections.

A further object of the invention is to provide a registering device adapted for connection with the usual vacuum tank of a fuel supply system whereby the indicating dials of the registering device are actuated by each re-filling of the vacuum tank.

Other objects and advantages of the invention will be apparent during the course of the following description.

In the accompanying drawings forming a part of this specification, and in which like numerals are employed to designate like parts throughout the same.

In the drawings wherein for the purpose of illustration are shown several embodiments of the invention, attention being first directed to Figures 1 to 7 inclusive, the numeral 10 designates an automobile engine having the usual intake manifold 11, adapted for connection with a carburetor 12. The carburetor 12 is provided with the usual fuel supply pipe 13 connected, as at 14, with the usual vacuum supply tank 15. The vacuum tank 15 is the construction employed in most motor vehicles of the present day, and embodies the usual float 16 controlling the intake of liquid fuel into the tank, and the usual vacuum connection 17 which is ordinarily connected through a suitable pipe to the intake manifold of the engine.

Operation of the vacuum tank is controlled by a vent valve and an intake valve governing communication between the vacuum tank and the intake manifold of the engine through the connection 17, the valves being operated by the float 16. Reference is made to the patent to Webb Jay, No. 1,125,549, granted January 19th, 1915, wherein there is disclosed a vacuum tank of the type above outlined and from which the operation of the valves of the vacuum tank will be apparent.

Figure 1:
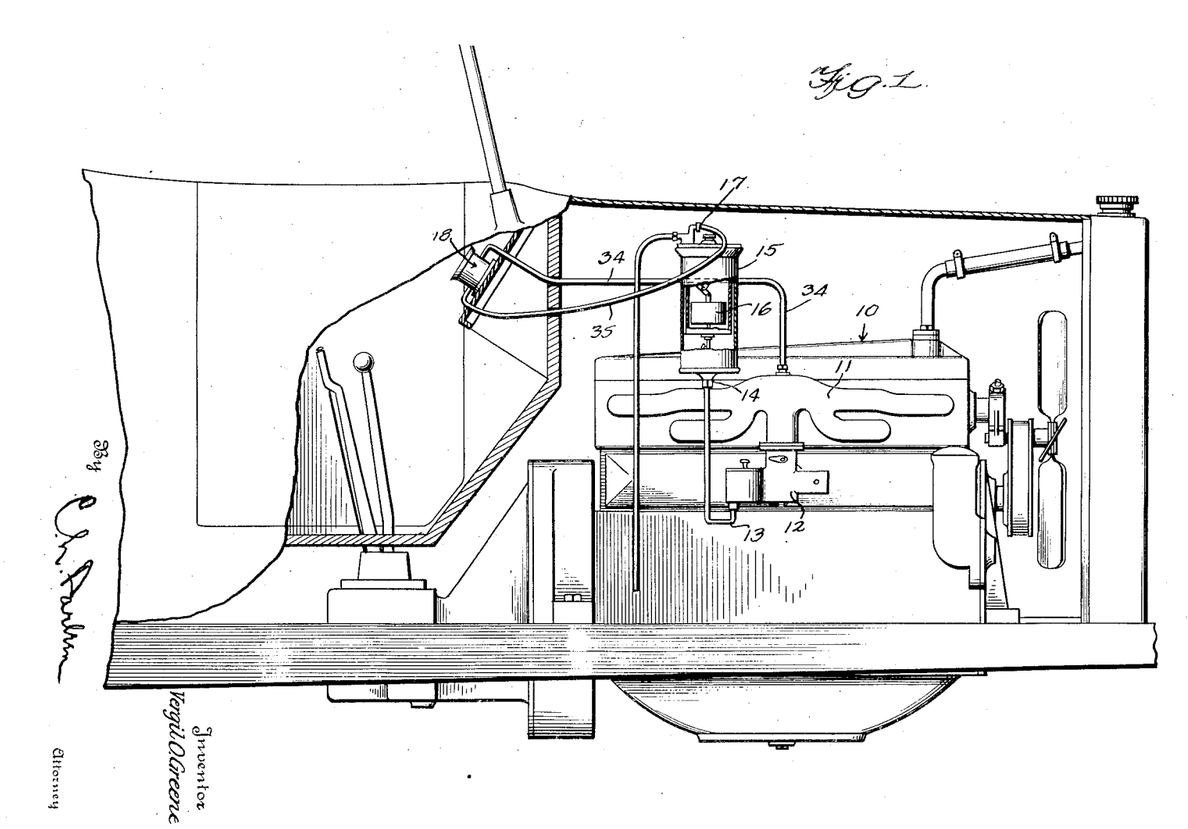
Figure 1 is a side elevation showing the connection of the present invention with the automobile engine and vacuum tank.
Figure 2:
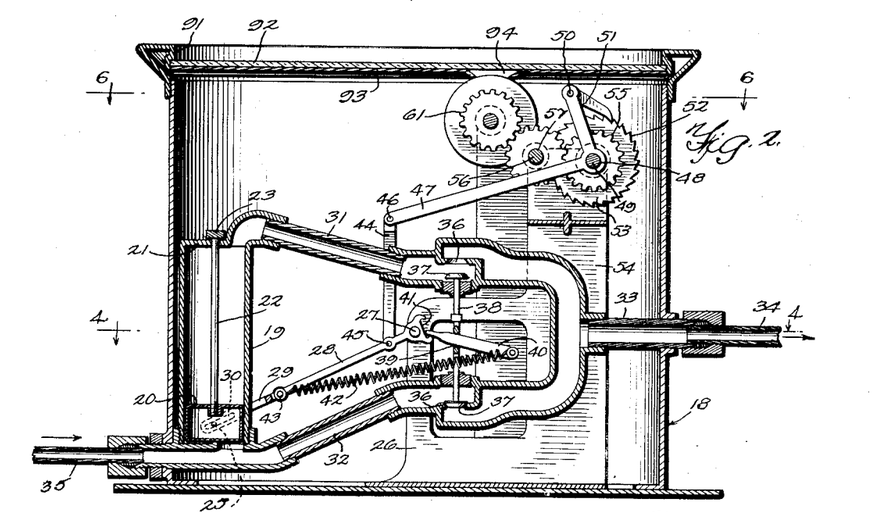
Figure 2 is a central vertical sectional view through the preferred form of the invention showing the operating piston and associated elements in one position.

In the present invention, I employ a substantially cylindrical casing 18, preferably mounted in any suitable manner upon the dash board of the vehicle. The casing 18 is provided internally with a cylinder 19, having therein a piston 20 having a sliding fit within the cylinder. As shown in Figure 2, the cylinder 19 extends downwardly to a point adjacent the lower end of the casing, but its upper end is spaced from the upper end of the casing 18. The upper end of the cylinder 19 is closed by a head 21. The piston 20 is provided substantially centrally thereof with a piston rod 22, extending outwardly beyond the upper end of the cylinder 19 through a suitable opening provided in the head 21. The upper end of the piston rod 22 is provided with a cross head 23 having depending arms 24 arranged substantially parallel to the sides of the cylinder, as clearly shown in Figure 7. The lower ends of the arms 24 are provided with outstanding trunnions 25 for a purpose to be described.

An upstanding bracket 26 is arranged upon the bottom of the casing, and is provided at its upper end with a pivot pin 27 upon which is pivoted a vertically movable arm 28. The outer end of the arm 28 is bifurcated, as at 29, the portions 29 being provided with slots 30 adapted to receive the trunnions 25. It will be apparent that reciprocation of the piston 20 will rock the arm upwardly and downwardly on its pivot 27.

The upper end of the cylinder 19 is adapted to communicate with a vacuum pipe 31 which extends across the casing 18, as shown. The lower end of the cylinder 19 is provided with a similar vacuum pipe 32, and these pipes converge at the opposite side of the casing 18 into a single pipe 33, which is adapted for connection with a conduit 34, which has its opposite end connected with the intake manifold 11 of the engine. The numeral 35 designates a second conduit which communicates with the pipe 32 and the lower end of the cylinder 19. The opposite end of the conduit 35 is attached to the vacuum connection 17 of the vacuum tank 15.

The pipes 31 and 32 are provided with oppositely arranged valve seats 36, which are adapted to be alternately opened and closed by valves 37. The valves 37 are rigidly connected by a valve stem 38 which is provided substantially centrally thereof with a slot 39. An operating arm 40 passes through the slot 39 and has its opposite ends extending a substantial distance upon each side of the stem 38. The inner end of the arm 40 is received within the forked end 41 of the arm 28. The outer end of the arm 40 is connected with one end of a retractile spring 42, the opposite end of which is connected as at 43, with the outer end of the arm 28.

The numeral 44 designates an upstanding push rod which is pivotally connected at its lower end, as at 45, to the arm 28. The upper end of the arm 44 is pivotally connected as at 46, with one end of a bell crank lever 47. The bell crank lever is pivoted, as at 48, to a transverse shaft 49. The opposite end of the bell crank lever 47 is pivotally connected, as at 50, with an operating pawl 51 which is adapted to engage ratchet teeth 52, upon a wheel 53, which in turn is also rotatably mounted upon the shaft 49. The shaft 49 is suitably journaled in a bearing bracket 54. Upon the opposite side of the bracket 54, a gear wheel 55 is rigidly secured to the shaft 49.

The numeral 56 designates a counter operating shaft and this shaft is provided with a pinion 57 meshing with the gear 55 to be driven thereby. A series of number wheels 58 is mounted upon a shaft 59, arranged parallel to the shaft 56. The wheels 58 are adapted to count a total number of gallons of liquid fuel consumed by an automobile. A smaller series of number wheels 60 is provided upon the opposite side of the device for indicating the consumption of fuel for a single trip or over a given space of time. The number wheels 58 and 60 are driven from the pinion 57 by a gear 61, secured to the shaft 59. The numeral 62 designates a knob carried upon the extended end 63 of the shaft 59, whereby the shaft may be withdrawn to disconnect the gears 57 and 61 and connect a gear 64 upon the shaft 59 with a gear 65 rotatably connected with a knob 66. It will be apparent that rotation of the knob 66 after the handle 62 has been withdrawn will turn the counters 60 in order that they may be re-set to zero. The counter mechanism employed may be of any well known or preferred construction and forms no part of the present invention. Detail description of the transfer mechanism of the counters is thought to be unnecessary.

In Figures 8 to 12 inclusive of the drawings, I have illustrated a modified embodiment of the invention, wherein I have provided alined tangential vacuum pipes 67 and 68, passing through the outer portion of the casing 18. A circular housing 69 is mounted substantially centrally of the pipes 67 and 68 and is provided with a central shaft 70 upon which is rigidly mounted a rotor 71 having blades 72 arranged in the pipes 67 and 68. The upper end of the shaft 70 is journaled in a bearing bracket 73, suitably secured to the casing 18. The shaft 70 is provided with governor springs 74, having the usual governor weights 75 secured thereto, substantially centrally thereof. The lower ends of the springs 74 are connected with a vertically movable plate 76, mounted upon the shaft 70.

Figure 9:
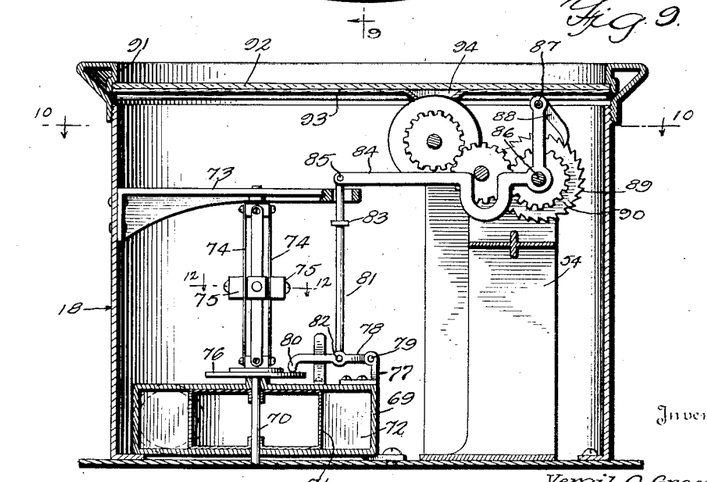
Figure 9 is a section on line 9—9 of Figure 8.
Figure 10:
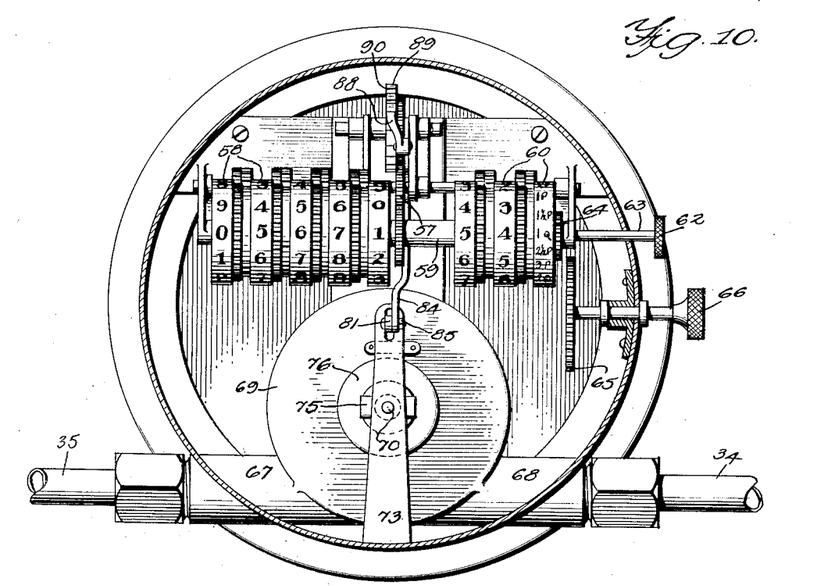
Figure 10 is a section on line 10—10 of Figure 9.
Figure 11:
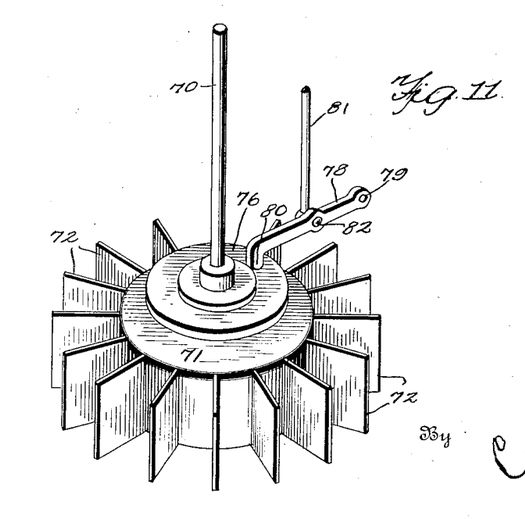
Figure 11 is a perspective view of the rotor and associated elements, and, Figure 12 is a section on line 12—12 of Figure 9.
Figure 12:
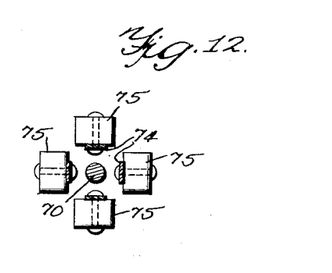

A bracket 77 is mounted upon one face of the housing 69 and an operating arm 78 is pivoted at one end to the bracket 77, as at 79. The opposite end of the arm 78 is down-turned, as at 80, and reaches to a point in proximity to the upper face of the plate 76.

A push rod 81 is connected, as at 82, intermediate the ends of the arms 78, and its upper end is slidable in an opening in the outer end of the bracket 73. Upward movement of the push rod 81 is limited by a collar 83, adapted to contact with the bracket 73. One end 84 of a bell crank lever is connected, as at 85, with the upper end of the push rod 81. The bell crank lever is pivoted upon a shaft 86, and its upper end has pivoted thereto, at 87, an operating pawl 88. The pawl 88 is adapted to contact with ratchet teeth 89, carried upon a ratchet wheel 90 which is also rotatably mounted upon the shaft 86. The wheel 90 is adapted to actuate a counter mechanism somewhat similar to that shown and described in connection with the preferred form of the invention.

Figure 5:
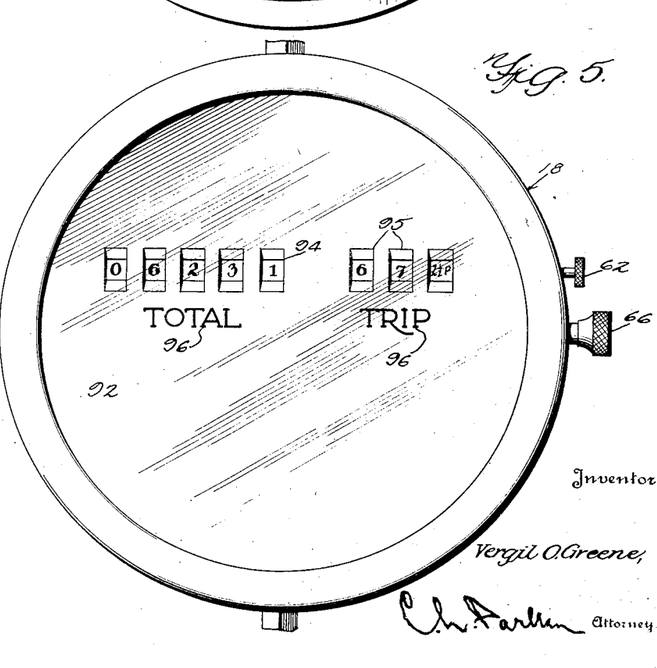
Figure 5 is a face view of the device.
Figures 6, 7:
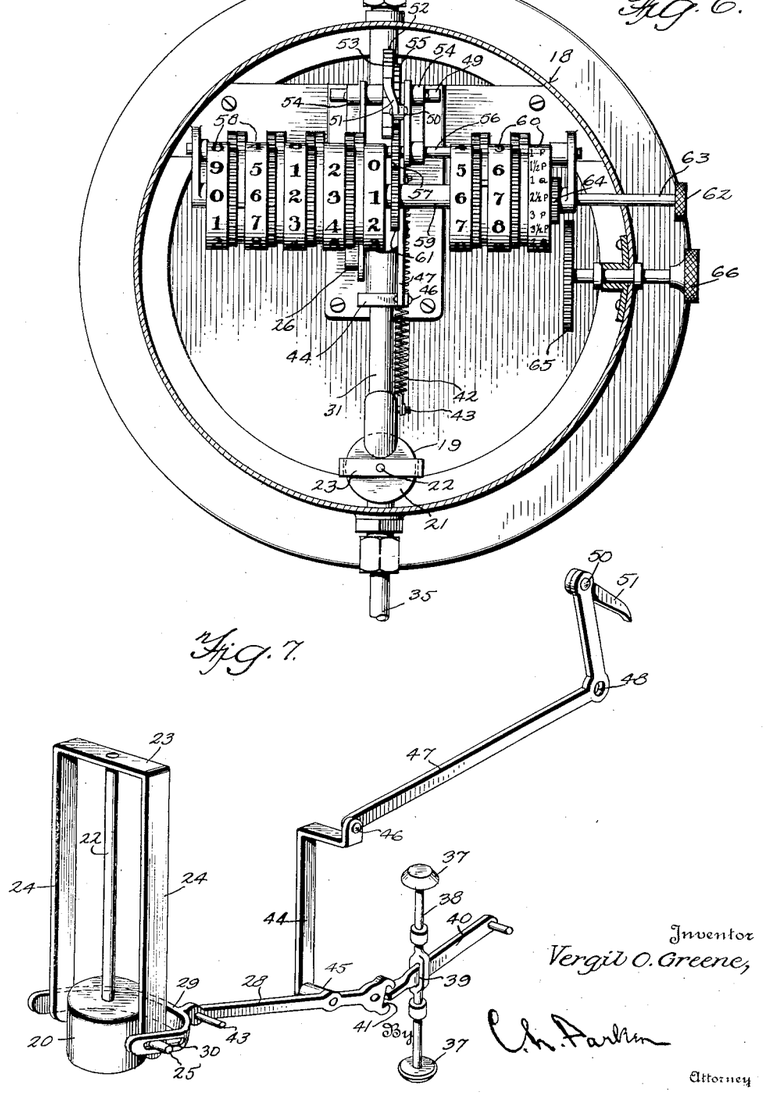
Figure 6 is a section on line 6—6 of Figure 2.
Figure 7 is a perspective view of the piston and movable elements associated therewith.

The casing 18 is provided at its open end with a flange 91 adapted to retain the glass 92. A dial face 93 is arranged beneath the glass 92 and is provided with openings 94 adapted to successively register with the numbers of the number wheels 58 and with openings 95 adapted to successively register with the numbers of the number wheels 60. Suitable indicia 96 is marked upon the dial face 93 to indicate "trip" and "total".

Figure 3:
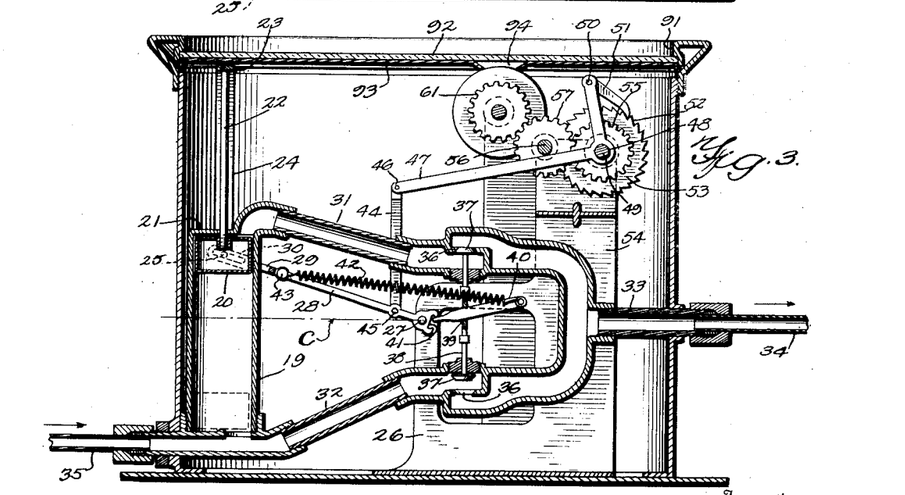
Figure 3 is a similar view showing the operating piston in the reverse position.
Figure 4:
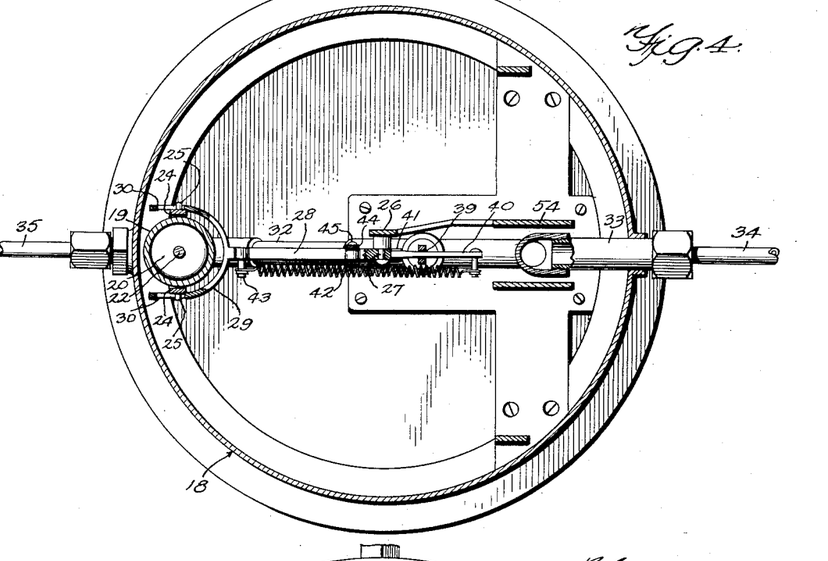
Figure 4 is a section taken on line 4—4 of Figure 2.

The operation of the preferred form of the invention is as follows:

The line designated at C of Figure 3 represents the center line of the pivot pin 27. From an examination of Figures 2 and 3, it will be found that the piston 20 moves a substantially greater distance below the line C than above this line. The position of the piston 20 in Figure 2 represents the initial position of the working parts of the device. When the feed valve within the vacuum tank 15 opens to permit refilling of the tank, the vacuum in the engine manifold creates a vacuum within the pipes 31 and 33 while the air pressure within the upper part of the tank 15 acts against the lower face of the piston 20, causing it to move to the upper position as shown in Figure 3. When the piston 20 moves upwardly, it swings the spring 42 past the center of the pin 27, snapping the arm 40 upwardly, closing the upper valve 37 and opening the lower valve.

When the intake valve of the vacuum tank closes, the vacuum of the intake manifold acts upon the lower face of the piston 20, causing it to move downwardly to the initial position shown in Figure 2. This action completes one movement of the counters, as will be understood, and places the piston 20 in position to be again operated when a fresh supply of gasoline is taken into the vacuum tank. Fixed quantities of fuel are taken into the vacuum tank at each opening of the intake valve thereof, and a fixed movement of the counters is accomplished at each re-filling of the tank so that the consumption of the fuel may be accurately measured. The placing of the piston 20 in its lower position a substantial distance below the line C requires a greater amount of power to move the piston upwardly, thus preventing its movement by vibration or the like, except upon opening of the intake valve of the vacuum tank. When the piston is in the upper position, the spring 42 is a relatively short distance above the pivot pin 27 so that a relatively small force is required to return it to the normal position. The vacuum created within the pipe 32 has been found sufficient to accomplish downward movement of the piston 20.

Figure 8:
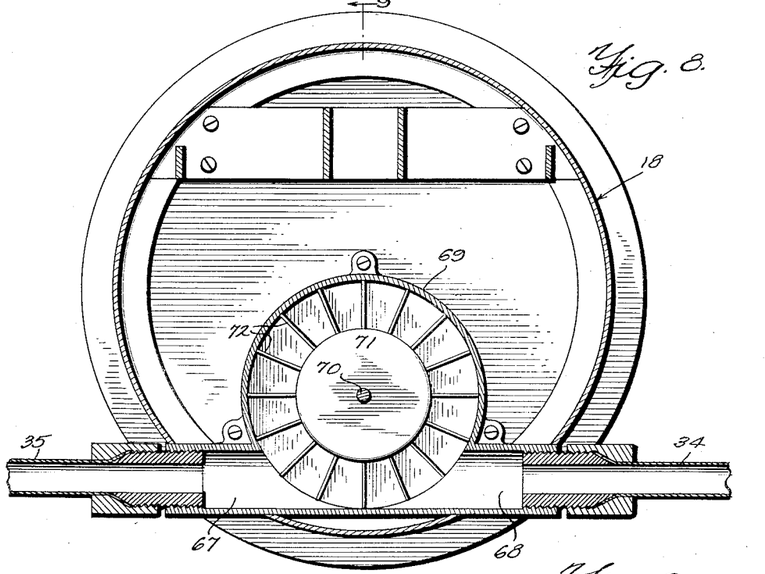
Figure 8 is a horizontal sectional view of a modified form of the device.

The operation of the form of the device shown in Figures 8 to 12 inclusive is as follows:

When the intake valve of the vacuum tank is opened, the air in the upper part of the tank is released for passage through the conduit 35, pipes 67 and 68, and conduit 34. The passage of air through the pipes 67 and 68 causes rotation of the rotor 71, which rotation operates the governor mechanism to move the weights 75 outwardly, regardless of the distance of travel of the blades 72. Outward movement of the weights 75 raises the plate 76 and arm 78. Upward movement of the arm 78 actuates the push rod 81 and bell crank lever 84 which, in turn, transmits its movement to the counting mechanism, as will be obvious.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, I claim:

1. The combination with an internal combustion engine having an intake manifold, means for supplying fuel to the engine, a vacuum tank for controlling the passage of the fuel to the engine, and a vacuum conduit adapted to establish communication between said manifold and said tank, of a movable member connected in said conduit and operable upon the opening of the intake valve of said tank, a counting mechanism, and means connected between said movable member and said counting mechanism for actuating the latter upon movement of said movable member.

2. The combination with an internal combustion engine having an intake manifold, means for supplying fuel to the engine, a vacuum tank for controlling the passage of the fuel to the engine, and a vacuum conduit adapted to establish communication between said manifold and said tank, of a movable member connected in said conduit and operable upon the opening of the intake valve of said tank, a counting mechanism, means connected between said movable member and said counting mechanism for actuating the latter upon movement of said movable member, and means for returning said movable member to normal position.

3. The combination with an internal combustion engine having an intake manifold, means for supplying fuel to the engine, a vacuum tank for controlling the passage of the fuel to the engine, and a vacuum conduit adapted to establish communication between said manifold and said tank, of a reciprocating member connected in said conduit and movable in one direction upon the opening of the intake valve of said tank, a counting mechanism, and means connected between said reciprocating member and said counting mechanism for actuating the latter upon movement of said reciprocating member.

4. The combination with an internal combustion engine having an intake manifold, means for supplying fuel to the engine, a vacuum tank for controlling the passage of the fuel to the engine, and a vacuum conduit adapted to establish communication between said manifold and said tank, of a reciprocating member connected in said conduit and movable in one direction upon the opening of the intake valve of said tank, a counting mechanism, means connected between said reciprocating member and said counting mechanism for actuating the latter upon movement of said reciprocating member, and means for returning said reciprocating member to normal position.

5. The combination with an internal combustion engine having an intake manifold, means for supplying fuel to the engine, a vacuum tank for controlling the passage of the fuel to the engine, and a vacuum conduit adapted to establish communication between said manifold and said tank, of a reciprocating member connected in said conduit and movable upon the opening of the intake valve of said tank, said reciprocating member being adapted to return to the initial position upon the closing of the intake valve of said tank, resilient means for normally maintaining said reciprocating member in the normal position, a counting mechanism, and means connected between said reciprocating member and said counting mechanism for actuating the latter upon initial movement of said reciprocating member.

6. The combination with an internal combustion engine having an intake manifold, means for supplying fuel to the engine, a vacuum tank for controlling the passage of the fuel to the engine, and a vacuum conduit adapted to establish communication between said manifold and said tank, of a branch pipe connected in said conduit, a cylinder communicating between said pipe and said conduit, a piston mounted for reciprocation within said cylinder, valves arranged in said pipe and said conduit, a movable member connected with said piston, means operable by said movable member for alternately opening and closing said valves, a counting mechanism, and means connected between said movable member and said counting mechanism for actuating the latter upon movement of the piston in one direction.

7. The combination with an internal combustion engine having an intake manifold, means for supplying fuel to the engine, a vacuum tank for controlling the passage of the fuel to the engine, and a vacuum conduit adapted to establish communication between said manifold and said tank, of a branch pipe connected in said conduit, a cylinder communicating between said pipe and said conduit, a piston mounted for reciprocation within said cylinder, valves arranged in said pipe and said conduit, a movable member connected with said piston, means operable by said movable member for alternately opening and closing said valves, a counting mechanism, means connected between said movable member and said counting mechanism for actuating the latter upon movement of the piston in one direction, and resilient means for maintaining the piston in either position until the valves are shifted.

8. The combination with an internal combustion engine having an intake manifold, means for supplying fuel to the engine, a vacuum tank for controlling the passage of the fuel to the engine, and a vacuum conduit adapted to establish communication between said manifold and said tank, of a branch pipe connected in said conduit, a cylinder communicating between said pipe and said conduit, a piston mounted for reciprocation within said cylinder, valves arranged in said pipe and said conduit, a valve stem connecting said valves, said valve stem being provided with a slot, a valve operating arm mounted in said slot, an arm pivotally mounted near one end thereof, said arm being provided near its pivot with a forked end adapted to receive the end of said valve operating arm, the opposite end of said pivoted arm being connected with said piston to move therewith, a spring connected between said arms, said spring being adapted to move across the pivot point of said pivoted arm upon movement in either direction of said piston, a counting mechanism, and means connected between said pivoted arm and said counting mechanism for actuating the latter upon movement of the piston in one direction.

9. The combination with an internal combustion engine having an intake manifold, means for supplying fuel to the engine, a vacuum tank for controlling the passage of fuel to the engine, and a vacuum connection adapted to establish communication between said manifold and said tank, said vacuum connection and a portion of said vacuum tank forming a vacuum chamber, of a conduit through which air is adapted to pass, said conduit being connected to said vacuum chamber, the valves of said vacuum tank being adapted to control the pressure within said conduit whereby there is caused a periodic difference of pressure at opposite ends thereof to effect the movement of air therethrough, a chamber communicating with said conduit intermediate its ends, a movable member mounted in said chamber and operable upon a movement of air through said conduit, and a counting mechanism operatively connected with said movable member.

In testimony whereof I affix my signature.

VERGIL O. GREENE.